Figure 1:
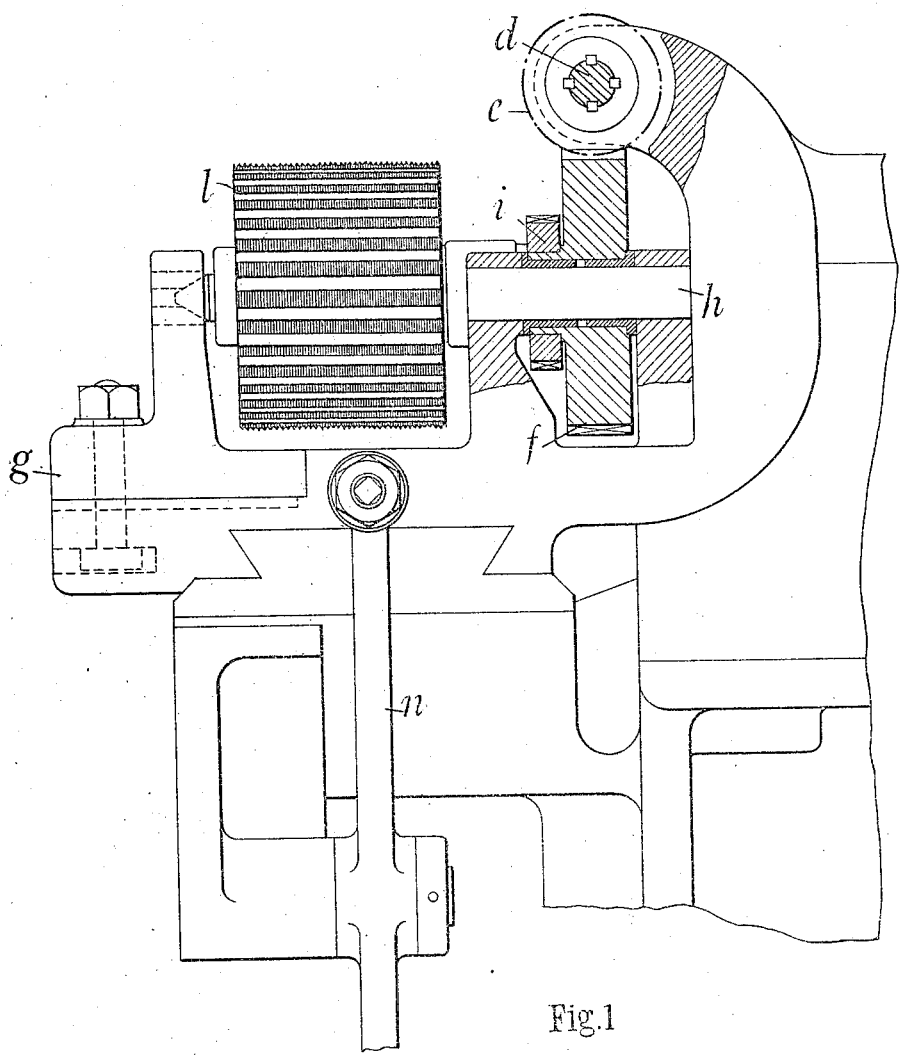

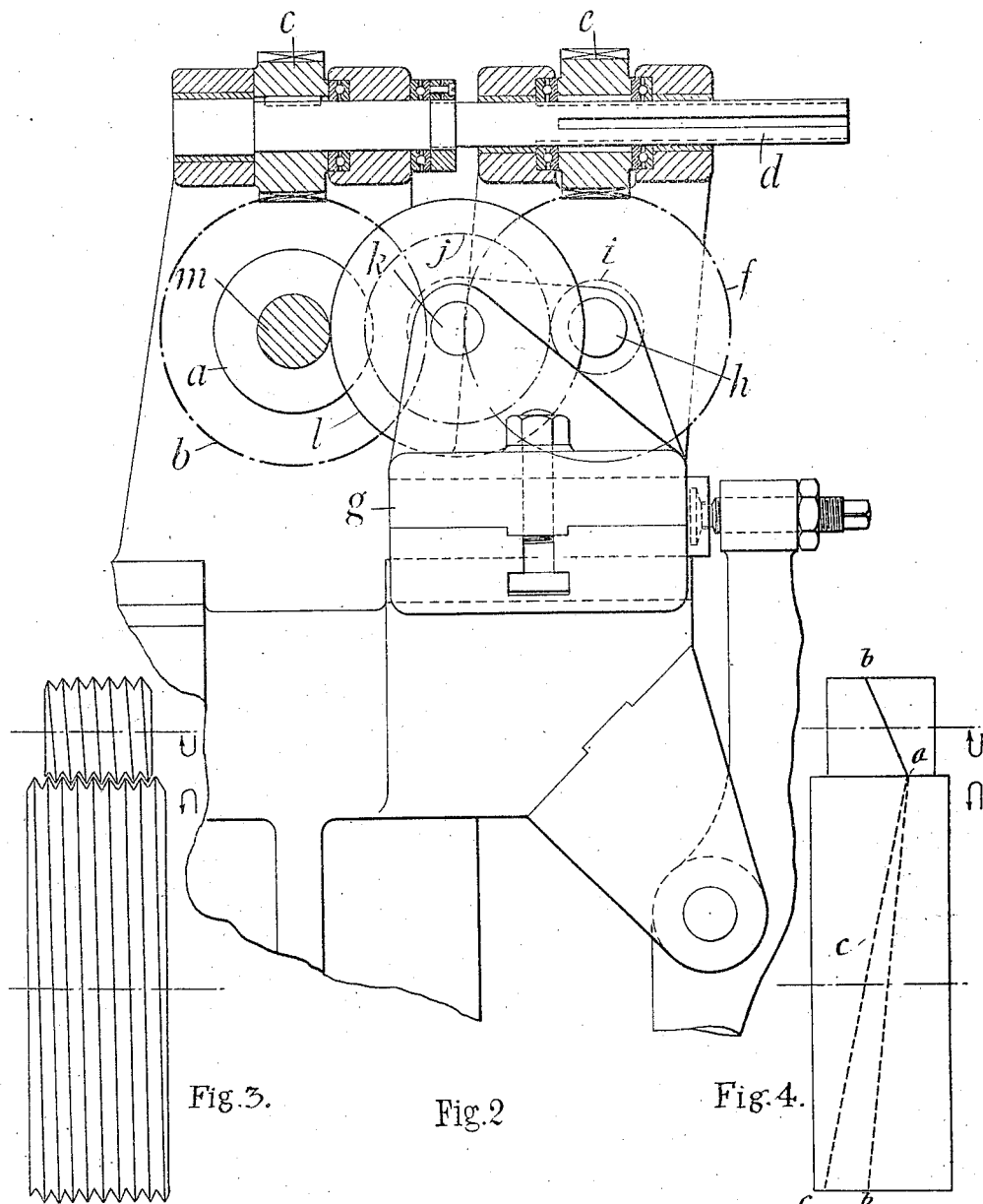

UNITED STATES PATENT OFFICE.

GEORGE HENRY ALEXANDER, OF BIRMINGHAM, ENGLAND.

MACHINE AND APPLIANCE FOR CUTTING OR FORMING SCREW-THREADS.

1,173,078.  Specification of Letters Patent.  Patented Feb. 22, 1916.

Application filed May 2, 1914. Serial No. 835,914.

*To all whom it may concern:*

Be it known that I, GEORGE HENRY ALEXANDER, subject of the King of Great Britain, residing at Doe street, in the city of Birmingham, England, engineer, have invented certain new and useful Improvements Relating to Machines and Appliances for Cutting or Forming Screw-Threads, of which the following is a specification.

This invention has for its object to provide for the more ready and effective cutting or forming of screw threads upon rods and other parts of iron, steel or other metal.

It has previously been proposed to employ a screw threaded mill or cutter of the same pitch as the screw to be produced and several times larger in diameter, the mill being rotated at the same rate as the work piece and advanced on to the same in a direction at right angles to the axis of the work piece. According to my experience this device possesses the disadvantage that small facets are produced thereby on the thread of the work piece.

The present invention, by which the said disadvantage is avoided, comprises the use of a screw threaded mill like rotating tool having a multiple start thread of the same pitch as that required on the work piece and rotating relatively to the work piece at a rate which is inversely proportional to the number of starts on the mill. By "pitch" is meant the distance between any one ridge and the next.

In the two accompanying sheets of explanatory drawings:—Figure 1 is a side elevation and Fig. 2 a front elevation illustrating diagrammatically a machine adapted for cutting screw threads in accordance with this invention. Figs. 3 and 4 are views showing the tool and work in contact with each other, the views illustrating the manner of cutting the single start thread on the work by a two-start thread on the tool.

Upon the chuck or work holder *a* of a screwing machine or lathe is secured a spiral wheel *b* which rotates a similar spiral wheel *c* secured on the spindle *d*. On the latter is mounted a spiral wheel *e* gearing with a spiral wheel *f* on a slide *g*. The wheel *e* can slide along the spindle *d*. Rotation of the said wheel by the spindle is effected by a feather key, spline, or its equivalent. The spindle *h* of the wheel *f* carries a pinion *i* gearing with a pinion *j* on the spindle *k* which is situated parallel with the axis of the work holder *a*. On the spindle *k* adjacent the chuck or work holder, there is fitted the mill like tool *l* having its periphery adapted for the desired screwing of the work piece as *m* which is secured in and rotated by the chuck. The tool *l* is provided with a screw thread formed around the periphery of the tool and also longitudinal or other grooves for clearance and cutting purposes. The pitch of the thread is identical with that to be cut, and the shape of the thread is made as nearly like that to be cut as possible. Ordinarily the thread on the tool is a little narrower than the groove to be cut in the work piece, the amount of the difference depending on the diameter of the tool. Usually the tool is considerably larger in diameter than the work piece, four to five times being found convenient in practice.

To bring the aforesaid screwing tool into action, the cross slide or its equivalent is advanced, *e. g.* by a cam actuated lever *n* or other device. Such movement brings the tool up to and into engagement with the work piece. The advance of the cross slide is continued until the required thread has been cut or formed on the work piece.

Instead of employing a single start thread on the tool *l* as heretofore the tool is formed with a two-start or other multiple thread and the speed of the tool is proportionately less. That is to say, with a two-start tool cutting a single start thread on the work piece, the rate of rotation of the tool is one half that of the work piece. By the use of a multi-start thread on the tool a smooth thread without facets is produced on the work piece and an advantage is gained in operation inasmuch as the peripheral speed of the tool is considerably less than when the tool is formed with a single start thread and rotated at the same speed as the work.

The manner in which a single thread is cut on the work by a two-start or other multiple thread on the tool is illustrated in Figs. 3 and 4.

Fig. 3 shows the outline of a screw in contact with the periphery of the milling tool. From this it is evident that so long as the dimensions of the grooved portions of the tool are the same as the thread the two parts must roll together no matter whether the tool has a single or a multi-start thread formed on it. The condition is not the same as when a screw engages a nut. This perhaps is made clearer by Fig.

4 which is a plan showing the direction of one half of a thread on the upper side of the job and the direction of the corresponding thread on the tool which, of course, lies on the underside of the tool. It is understood that the two pieces rotate in the same direction, that is to say the contacting parts are moved in opposite directions.

Starting at $a$ Fig. 4, where the job and tool touch, the point of the thread on the tool will cut into the job. Proceeding slowly through one half a revolution, when the point $b$ on the job reaches the tool, the corresponding point $b$ on the tool will coincide with that point, if the tool is formed with a single-start thread and is rotated at the same number of revolutions as the job. Between the points $a$ and $b$ every point on the tool will meet a corresponding point on the job and consequently during half a revolution, half the thread will be cut by the tool. Assuming the tool to be formed with a two-start thread, then the extreme end of the half thread on the tool will be at the point $c$ Fig. 4, and as this is twice the distance corresponding to points $a$ and $b$ on the job it follows that in order that a line corresponding to $a$, $b$, shall be cut on the job the tool must be rotated at half the speed. The point $c'$ on the tool will then coincide with the point $b$ consequently during a quarter of a revolution of the tool half a thread will be cut on the job. The number of starts on the tool makes absolutely no difference to the character of the thread cut on the job so long as the relative speeds of the tool and job are in the proper proportion. As before stated the threads on the tool have to be made rather narrower than the grooves to be cut on the job because the lines of the two threads cross where the job and tool touch, but the pitch of the threads is the same.

Ordinary parting or cutting off and finishing tools may be employed with the cross slide carrying the screwing tool aforesaid.

The invention is applicable to lathes or screwing machines of varying types as employed to meet varying services or requirements.

Having thus described my invention what I claim as new and desire to secure by Letters Patent is:—

In screw cutting appliances of the type in which is employed a screw threaded mill like rotating tool adapted to cut or form the required screw threads around the rotating work piece when advanced on to the same by a movement at right angles to the axes of the tool and work piece, a tool having a multiple start thread of the same pitch as that to be cut and rotating relatively to the work piece at a speed which is inversely proportional to the number of starts on the mill.

In testimony whereof I have signed my name to this specification in the presence of two subscribing witnesses.

GEORGE HENRY ALEXANDER.

Witnesses:
JOHN MORGAN,
FRANCIS MALPAS.